US011120263B1

(12) United States Patent
Lee

(10) Patent No.: US 11,120,263 B1
(45) Date of Patent: Sep. 14, 2021

(54) METHOD AND APPARATUS FOR PROVIDING EDUCATION SERVICE USING SATELLITE IMAGERY BASED ON ARTIFICIAL INTELLIGENCE

(71) Applicant: CONTEC CO., LTD., Daejeon (KR)

(72) Inventor: Sunghee Lee, Sejong-si (KR)

(73) Assignee: CONTEC CO., LTD., Daejeon (KR)

( * ) Notice: Subject to any disclaimer, the term of this patent is extended or adjusted under 35 U.S.C. 154(b) by 0 days.

(21) Appl. No.: 17/165,608

(22) Filed: Feb. 2, 2021

(30) Foreign Application Priority Data

Dec. 28, 2020 (KR) .................. 10-2020-0184775

(51) Int. Cl.
*G06K 9/00* (2006.01)
*G06K 9/32* (2006.01)
*G09B 5/02* (2006.01)
*G06F 16/29* (2019.01)

(52) U.S. Cl.
CPC ......... *G06K 9/00637* (2013.01); *G06F 16/29* (2019.01); *G06K 9/3241* (2013.01); *G09B 5/02* (2013.01)

(58) Field of Classification Search
None
See application file for complete search history.

(56) References Cited

U.S. PATENT DOCUMENTS

| | | | | |
|---|---|---|---|---|
| 7,212,670 B1* | 5/2007 | Rousselle | ............ | G06K 9/0063 382/173 |
| 8,788,431 B1* | 7/2014 | Shao | ............ | G06Q 50/16 705/313 |
| 10,528,812 B1* | 1/2020 | Brouard | ............ | G06K 9/6256 |
| 2012/0197685 A1* | 8/2012 | Mays | ............ | G06Q 30/02 705/7.34 |
| 2014/0368507 A1* | 12/2014 | Altman | ............ | G06T 17/05 345/426 |
| 2015/0058233 A1* | 2/2015 | Budlong | ............ | G06Q 50/16 705/315 |
| 2018/0032071 A1* | 2/2018 | Wieneke | ............ | G05D 1/0038 |
| 2018/0336652 A1* | 11/2018 | Wani | ............ | G06Q 50/265 |
| 2019/0066241 A1* | 2/2019 | Budlong | ............ | G06Q 50/165 |
| 2019/0073510 A1* | 3/2019 | West | ............ | G06T 7/0012 |
| 2019/0332931 A1* | 10/2019 | Montantes | ............ | G06F 3/0488 |
| 2020/0143212 A1* | 5/2020 | Okazaki | ............ | G06N 3/0454 |
| 2020/0258174 A1* | 8/2020 | Rodriguez | ............ | G06Q 50/165 |
| 2020/0387799 A1* | 12/2020 | Vivekraja | ............ | G06N 3/10 |

FOREIGN PATENT DOCUMENTS

KR 10-2012-0000732 A 1/2012
KR 10-2040702 B1 11/2019

* cited by examiner

*Primary Examiner* — Michelle M Entezari
(74) *Attorney, Agent, or Firm* — Studebaker & Brackett PC

(57) ABSTRACT

Provided is a service providing apparatus using satellite imagery. The service providing apparatus includes a satellite image information acquirer configured to acquire a satellite image; an object extractor configured to analyze the satellite image, extract an object from the satellite image, and generate an object image corresponding to the object; a storage configured to store the satellite image and the object image; and a service processing unit configured to provide an object extraction-based service and coding data associated with the object extraction-based service, based on at least one of the satellite image and the object image, and thereby provides a method of identifying and classifying various types of objects and buildings present on the ground surface based on image data on the ground surface.

11 Claims, 7 Drawing Sheets

METHOD AND APPARATUS FOR PROVIDING EDUCATION SERVICE USING SATELLITE IMAGERY BASED ON ARTIFICIAL INTELLIGENCE

CROSS-REFERENCE TO RELATED APPLICATIONS

This application claims the benefit under 35 USC § 119(a) of Korean Patent Application No. 10-2020-0184775 filed on Dec. 28, 2020 in the Korean Intellectual Property Office, the entire disclosure of which is incorporated herein by reference for all purposes.

BACKGROUND

1. Field

At least one example embodiment relates to a method of providing an education service using satellite imagery based on artificial intelligence.

2. Description of Related Art

An artificial satellite refers to an object that may fly in a predetermined circle or an elliptical orbit around the earth. The artificial satellite may be mounted on a launch vehicle and then fired to enter a predetermined orbit in the space and to perform a variety of predefined operations in the orbit. The artificial satellite functions to exchange data with other ground-based communication/electronic devices (e.g., satellite antennas and set-top boxes connected thereto) and/or to observe the ground surface while orbiting the earth.

To control, for example, monitor the artificial satellite or the launch vehicle and to receive data gathered by the artificial satellite, a ground station is installed on the ground.

Currently, about 1,600 artificial satellites are orbiting the earth and a number of artificial satellites around the earth are expected to increase as a space market is evolved from government-led development to private-led development.

However, through image data on the ground surface using such satellites, various types of objects and buildings present on the ground surface may be efficiently identified and classified. However, despite of a gradual increase in the application fields of such satellite imagery technology, there is little education content for use in education. In contrast, image data captured from satellites is highly likely to increase academic achievement through its use to block coding education.

SUMMARY

At least one example embodiment provides a method and apparatus for providing an education service using satellite imagery.

At least one example embodiment also provides coding education content using image data.

At least one example embodiment also provides education content using a method of identifying and classifying different types of objects and buildings present on the ground surface based on image data on the ground surface.

According to an aspect of at least one example embodiment, there is provided an education service providing apparatus using satellite imagery, the education service providing apparatus including a satellite image information acquirer configured to acquire a satellite image; an object extractor configured to analyze the satellite image, extract an object from the satellite image, and generate an object image corresponding to the object; a storage configured to store the satellite image and the object image; and a service processing unit configured to provide an object extraction-based service and coding data associated with the object extraction-based service, based on at least one of the satellite image and the object image. Through this, there is provided a method of identifying and classifying various types of objects and buildings present on the ground surface based on image data on the ground surface.

The service processing unit may be configured to provide an interface for selecting an administrative district to a display, control the display to display the satellite image based on the selected administrative district, provide an interface for selecting a type of a building to be detected to the display, and control the display to extract an object corresponding to the selected building from the satellite image and to display the extracted object on the satellite image.

The service processing unit may be configured to generate, in a block code form, a source code for extracting an object corresponding to the selected building type from the satellite image and store the generated source code in the storage.

The service processing unit may be configured to generate a first source code for artificial intelligence (AI)-based object extraction to extract an object corresponding to the selected building type from the satellite image, and generate a second source code capable of generating AI-based different object analysis statistical data based on object extraction by year and by building type.

The service processing unit may be configured to determine locations of different buildings selected by a user from a group of buildings that belong to the selected building type, and provide a plurality of travel route services according to the locations of different buildings and surrounding topography from the satellite image without receiving information from a satellite to calculate the locations of buildings and a current location of the user.

The service processing unit may be configured to generate a first source code for determining locations of different buildings selected by a user from a group of buildings that belongs to the selected building type, generate a second source code for providing a plurality of travel route services according to the locations of different buildings and surrounding topography from the satellite image without receiving information from a satellite to calculate the locations of buildings and a current location of the user, and combine the first source code and the second source code into a single block code executable with a one-time user input and store the same in the storage.

The service processing unit may be configured to collect a number of objects by building type and by year in response to an object extracted using a plurality of satellite images over different periods being a building, and analyze a ratio of buildings of a corresponding type with respect to the entire buildings by year and by building type, and generate object statistical analysis data by year and by building.

The service processing unit may be configured to display, on the display, a first satellite image and a second satellite image captured in different years with respect to the selected administrative district, distinguishably display a building corresponding to the selected building type using a first color in the first satellite image and the second satellite image, and display an area in which a number of buildings corresponding to the selected building type is greater than or equal to a threshold using a second color in the first satellite image and the second satellite image, to comparatively display the first satellite image and the second satellite image.

According to another aspect of at least one example embodiment, there is provided a service providing method using satellite imagery. Here, the service providing method is performed by a ground station or a service providing apparatus using satellite imagery configured to communicably connect to the ground station, and includes an object extraction/image generation process of analyzing an acquired satellite image, extracting an object from the satellite image, and generating an object image corresponding to the object; an image storage process of storing the satellite image and the object image; and a service processing process of providing an object extraction-based service and coding data associated with the object extraction-based service, based on at least one of the satellite image and the object image.

The service processing process may include a satellite image display process of providing an interface for selecting an administrative district to a display and controlling the display to display the satellite image based on the selected administrative district; an object display process of providing an interface for selecting a type of a building to be detected to the display and controlling the display to extract an object corresponding to the selected building type from the satellite image and to display the extracted object on the satellite image; and a source code generation/storage process of generate, in a block code form, a source code for extracting an object corresponding to the selected building type from the satellite image and storing the generated source code in a storage.

The source code generation/storage process may include generating a first source code for AI-based object extraction to extract an object corresponding to the selected building type from the satellite image, and generating a second source code capable of generating AI-based different object analysis statistical data based on object extraction by year and by building type.

The source code generation/storage process may include generating a first source code for determining locations of different buildings selected by a user from a group of buildings that belongs to the selected building type, generating a second source code for providing a plurality of travel route services according to the locations of different buildings and surrounding topography from the satellite image without receiving information from a satellite to calculate the locations of buildings and a current location of the user, and combining the first source code and the second source code into a single block code executable with a one-time user input and store the same in a storage.

According to some example embodiments, the aforementioned education service providing method and apparatus using the satellite imagery may effectively identify and classify various types of objects and buildings present on the ground surface.

The education service providing method and apparatus using the satellite imagery and apparatus may further improve academic achievements using satellite imagery as education content and may use the same as realistic education content.

The education service providing method and apparatus using the satellite imagery may provide an object extraction-based service and coding data associated with the object extraction-based service based on at least one of a satellite image and an object image.

The education service providing method and apparatus using the satellite imagery may generate AI-based different object analysis statistical data based on object extraction by year and by type.

The education service providing method and apparatus using the satellite imagery may provide a plurality of travel route services according to locations of different buildings and surrounding topography from a satellite image without receiving information from a satellite to calculate the locations of buildings and a current location of a user.

Other features and aspects will be apparent from the following detailed description, the drawings, and the claims.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
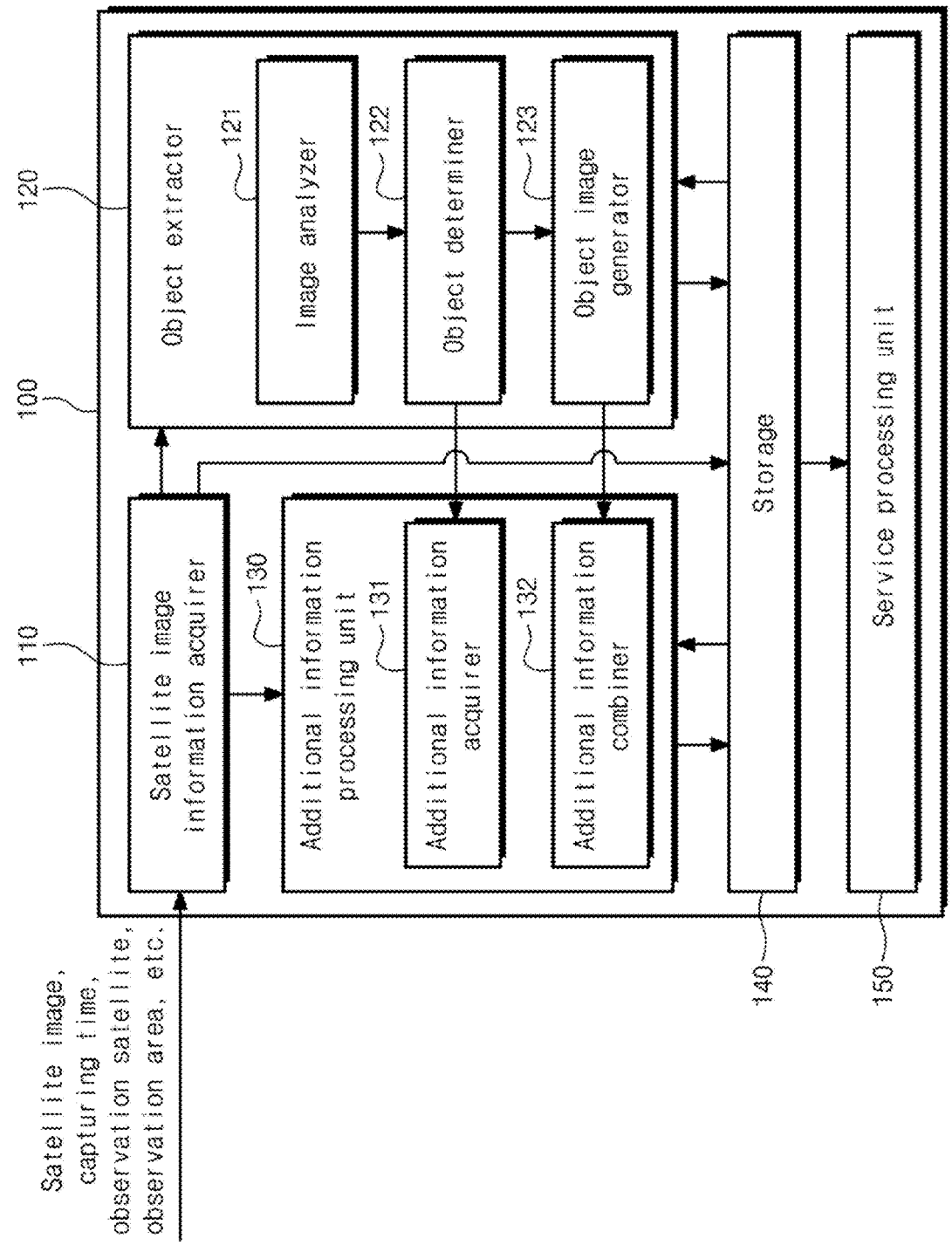
FIG. 1 illustrates an example of an education service providing apparatus using satellite imagery according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Unless the context clearly indicates otherwise, like reference numerals refer to like elements used throughout. Also, components used herein, such as, for example, terms "-unit/module," etc., may be implemented as software and/or hardware. Depending on example embodiments, each component with "-unit/module," etc., may be implemented as a single piece of software, hardware and/or a desired part, and also may be implemented as a plurality of pieces of software, hardware, and/or desired parts.

It should be noted that if it is described that one component is "connected," "coupled," or "joined" to another component, a third component may be "connected," "coupled," and "joined" between the first and second components, although the first component may be directly connected, coupled, or joined to the second component. On the contrary, it should be noted that if it is described that one component is "directly connected," "directly coupled," or "directly joined" to another component, a third component may be absent. Expressions describing a relationship between components, for example, "between," directly between," or "directly neighboring," etc., should be interpreted to be alike.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Terms, such as first, second, and the like, may be used herein to describe components.

Each of these terminologies is not used to define an essence, order or sequence of a corresponding component but used merely to distinguish the corresponding component from other component S). For example, a first component may be referred to as a second component, and similarly the second component may also be referred to as the first component. As used herein, the term "and/or" includes any and all combinations of one or more of the associated listed items.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, an education service providing apparatus using satellite imagery is described with reference to FIGS. 1 to 6.

An apparatus and method for providing an education service using satellite imagery according to an example embodiment is described. FIG. 1 illustrates an example of a satellite imagery education service providing apparatus according to an example embodiment.

Referring to FIG. 1, an education service providing apparatus 100 using satellite imagery may include a satellite image information acquirer 110 and a storage 140, and, depending on example embodiments, may further include at least one of an object extractor 120, an additional information processing unit 130, and a service processing unit 150.

The satellite image information acquirer 110 may receive and acquire satellite image information. Here, the satellite image information may include image data (hereinafter, a satellite image) of an area captured by an artificial satellite. The satellite image may be a still image or a moving picture. Also, depending on example embodiments, the satellite image information may further include at least one piece of related information required to provide a utilization service using satellite imagery, such as, for example, a capturing time of the satellite image, information about a capturing area d10 corresponding to the satellite image (e.g., latitude/longitude, global positioning system (GPS) coordinates, GLONASS coordinates or address, etc.), information about the artificial satellite that captures the satellite image (e.g., artificial satellite identification information), and/or a resolution of the satellite image. Such related information may be received together with the corresponding satellite image or sequentially. For example, the related information may be tagged to the satellite image and thereby received.

The satellite image information acquirer 110 may acquire the satellite image information over several times. In this case, the satellite image information acquirer 110 may periodically acquire the satellite image information or may aperiodically acquire the satellite image information.

According to an example embodiment, the satellite image information acquirer 110 may acquire satellite image information using a communication module. The communication module may include an apparatus capable of receiving an instruction or data from an external apparatus through a wired communication network, a wireless communication network including a near field communication network and a mobile communication network, or combination thereof. In this case, the satellite image information acquirer 110 may receive and acquire satellite image information through communication with another apparatus, for example, an artificial satellite, a space base station that communicates with the artificial satellite, and a satellite image database server. Also, the satellite image information acquirer 110 may include a data input/output module, such as, for example, a universal serial bus (USB) and a thunderbolt. In this case, the satellite image information acquirer 110 may acquire satellite image information from an external memory device, for example, a portable hard disk device and a USB memory. Satellite information received by the satellite image information acquirer 110 may be transferred to and stored in the storage 140 and, depending on example embodiments, may be transferred to the object extractor 120.

Figure 2:
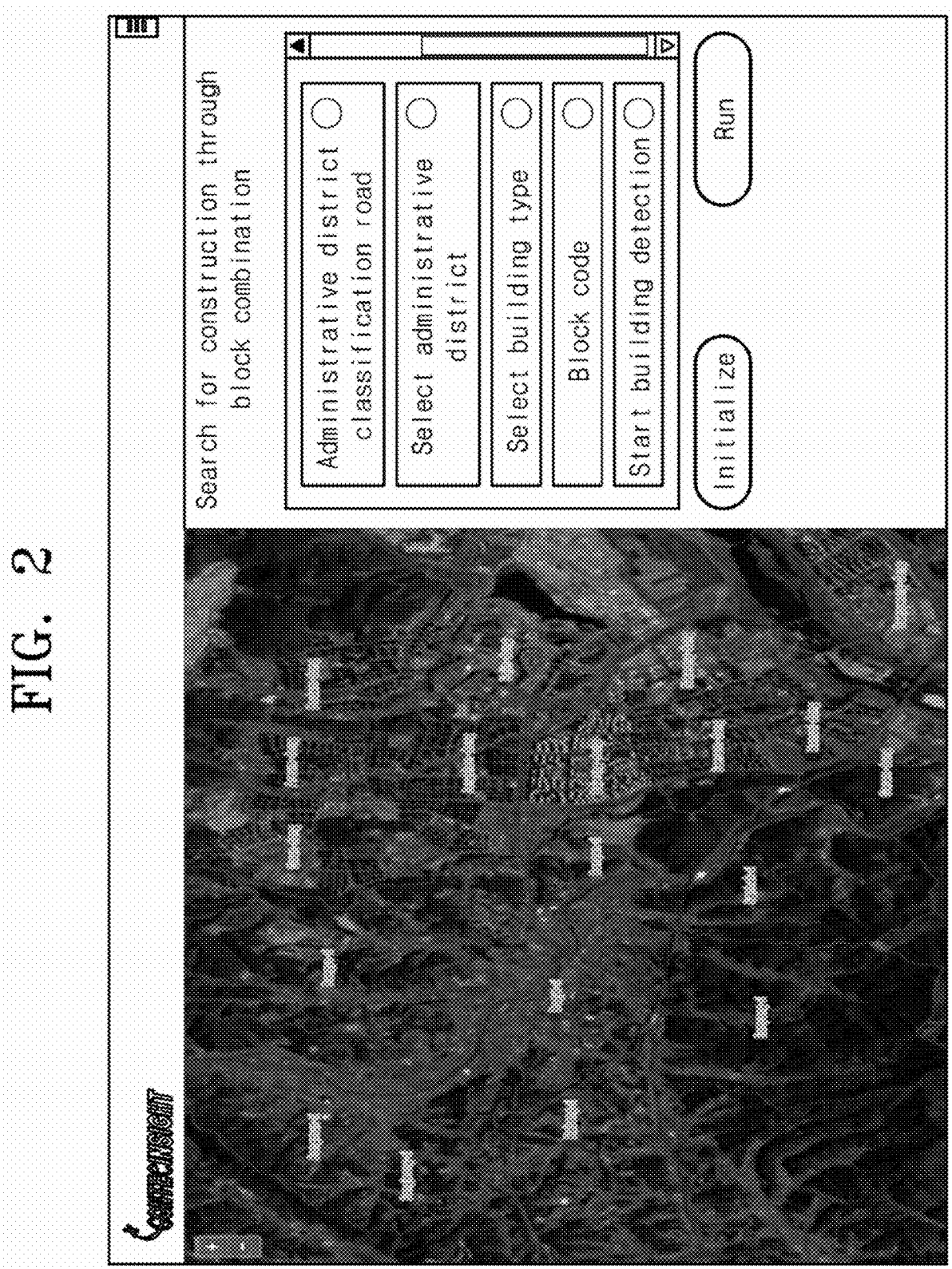
FIGS. 2 and 3 illustrate examples of a screen displayed on an education service providing apparatus using satellite imagery according to an example embodiment.
Figure 3:
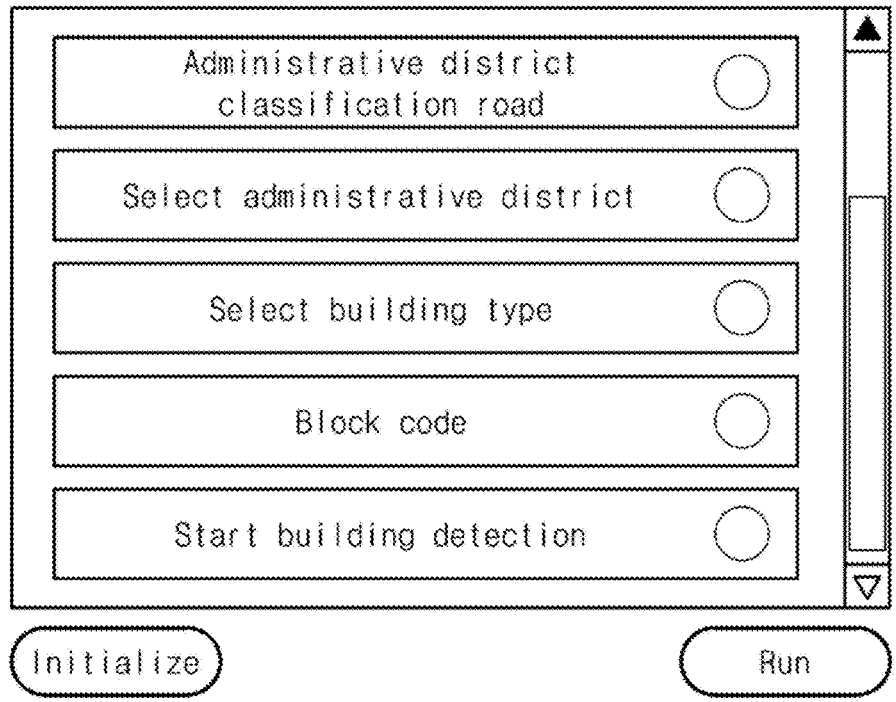
Figure 3:
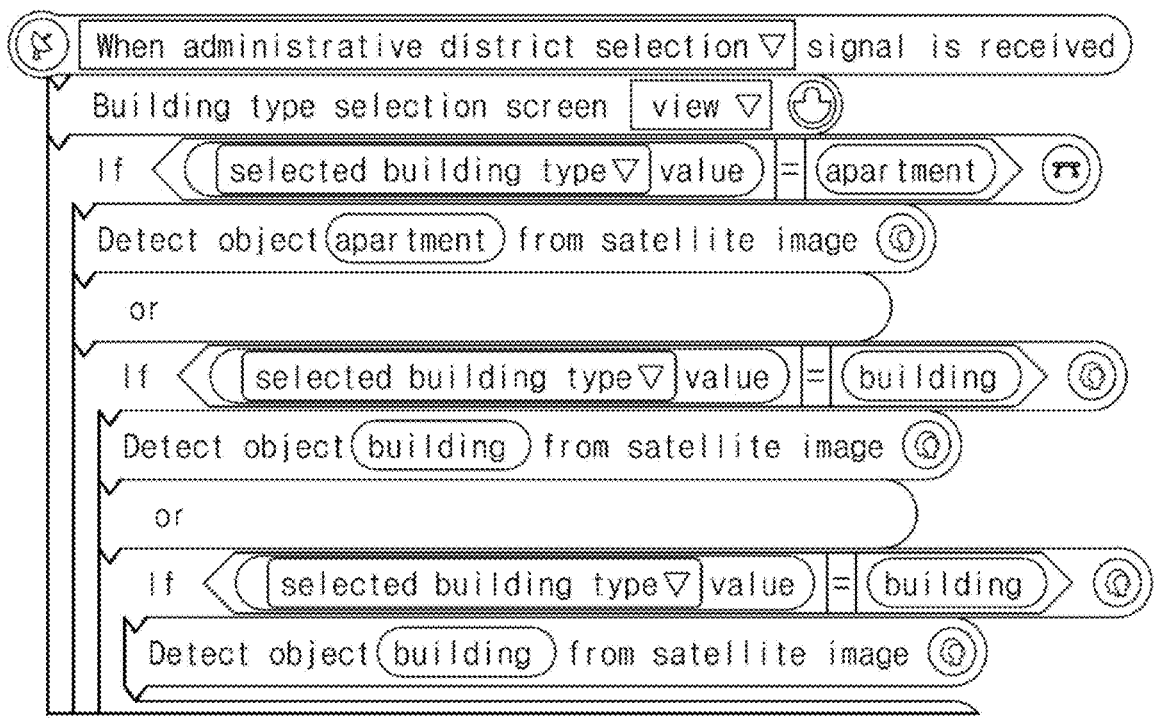

The education service providing apparatus using the satellite imagery of FIG. 1 may be provided to an output interface of FIGS. 2 and 3. FIGS. 2 and 3 illustrate examples of a screen displayed on an education service providing apparatus using satellite imagery according to an example embodiment.

FIG. 2 illustrates an example of a satellite imagery screen displayed on the education service providing apparatus using the satellite imagery and an interface associated with a process of controlling the satellite imagery screen according to an example embodiment. FIG. 3 illustrates an example of an interface for controlling a screen in the education service providing apparatus using the satellite imagery and a classification process by building type through the interface according to an example embodiment.

Referring to FIGS. 1 to 3, the education service providing apparatus 100 using the satellite imagery may include the satellite image information acquirer 110, the object extractor 120, the storage 140, and the service processing unit 150.

The satellite image information acquirer 110 is configured to acquire a satellite image. The object extractor 120 is configured to analyze the satellite image, extract an object from the satellite image, and generate an object image corresponding to the object. The storage 140 is configured to store the satellite image and the object image. The service processing unit 150 is configured to provide an object extraction-based service and coding data associated with the object extraction-based service, based on at least one of the satellite image and the object image.

The service processing unit 150 may provide an interface for selecting an administrative district to a display and may control the display to display the satellite image based on the selected administrative district. The service processing unit 150 may provide an interface for selecting a type of a building to be detected to the display. The service processing unit 150 may control the display to extract an object corresponding to the selected building type from the satellite image and to display the extracted object on the satellite image.

The service processing unit 150 may generate, in a block code form, a source code for extracting an object corresponding to the selected building type from the satellite image and may store the generated source code in the storage 140.

The service providing apparatus and method using the satellite imagery according to an example embodiment may apply to city management and planning.

Figure 4:
FIGS. 4 and 5 illustrate examples of urban analysis for city management and planning according to an example embodiment.
Figure 5:
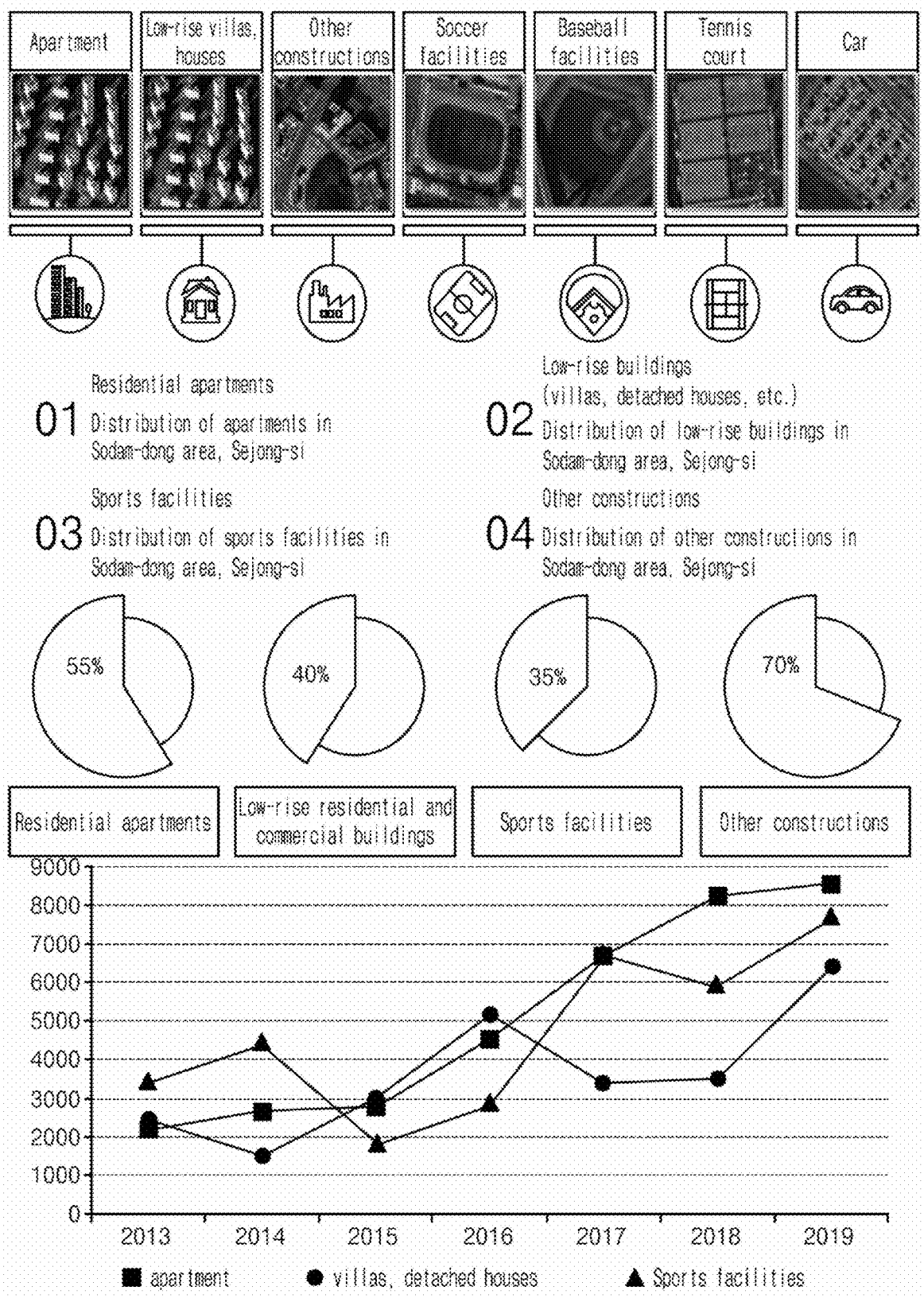

FIGS. 4 and 5 illustrate examples of urban analysis for city management and planning according to an example embodiment. FIG. 4 illustrates an example of spatial objects present on the ground surface corresponding to an urban area according to an example embodiment.

FIG. 5 illustrates an example of object analysis statistical data based on spatial object analysis according to an example embodiment.

Referring to FIGS. 1 to 5, the service processing unit 150 may generate a first source code for artificial intelligence (AI)-based object extraction to extract an object corresponding to the selected building type from the satellite image. Also, the service processing unit 150 may generate a second source code capable of generating AI-based different object analysis statistical data based on object extraction by year and by building type. In association with the building type, buildings may be classified into residential apartments, low-rise buildings (villas, detached houses, and the like), sports facilities, and other constructions, however, it is provided as an example only and may be modified depending on example embodiments.

The education service providing apparatus and method using the satellite imagery according to an example embodiment may provide a service based on satellite imagery. The service based on the satellite imagery may be a travel route service between different buildings. However, it is provided as an example only. The service processing unit 150 may determine locations of different buildings selected by a user from a group of buildings that belong to the selected building type. The service processing unit 150 may provide a plurality of travel route services according to the locations of different buildings and surrounding topography from the satellite image without receiving information from a satellite to calculate the locations of buildings and a current location of the user.

Also, the service processing unit 150 may generate source codes modularized for a plurality of different services, may combine the source codes into a single block code, and may provide the combined block code to the user. Therefore, source codes for satellite image-based various applications may be modularized. Also, the user may combine the modularized source codes and may construct various applications based on a user-desired customized satellite image.

The service processing unit 150 may generate a first source code for determining locations of different buildings selected by the user from a group of buildings that belongs to the selected building type. The service processing unit 150 may generate a second source code for providing a plurality of travel route services according to the locations of different buildings and surrounding topography from the satellite image without receiving information from a satellite to calculate the locations of buildings and a current location of the user. Also, the service processing unit 150 may combine the first source code and the second source code into a single block code executable with a one-time user input and may store the same in the storage 140.

Also, if an object extracted using a plurality of satellite images over different periods is a building, the service processing unit 150 may collect a number of objects by building type and by year. The service processing unit 150 may analyze a ratio of buildings of a corresponding type with respect to the entire buildings by year and building type, and may generate object statistical analysis data by year and by building. Here, the service processing unit 150 may generate the first source code for collecting a number of objects by building type and by year and the second source code for generating object statistical analysis data by year and by building.

Figure 6:
FIG. 6 illustrates an example of a screen on which changed area search, detection, and analysis are performed based on a satellite image according to an example embodiment.

Also, the service providing apparatus and method using the satellite imagery according to an example embodiment may perform changed area search, detection, and analysis based on a satellite image. FIG. 6 illustrates an example of a screen on which changed area search, detection, and analysis are performed based on a satellite image according to an example embodiment. FIG. 6 illustrates satellite images of the same district, for example, Sodam-dong, Sejong-si, captured in 2015 and 2018. Here, satellite images A1 and A2 captured from the same area within the same district on different dates may be compared. For example, comparing the satellite image A1 captured in 2015 and the satellite image A2 captured in 2018, it can be known that many buildings were newly constructed in the same area. Therefore, the service processing unit 150 may detect an area with a new building construction and different arrangement form in the same district of a different year.

The service processing unit 150 may analyze a type of a newly constructed building with respect to the area with the new building construction and different arrangement form. Also, the service processing unit 150 may generate a city planning analysis report that includes a type of building construction required in the next few years based on a type of the newly constructed building. The service processing unit 150 may generate the first source code for analyzing the type of the newly constructed building with respect to the area with the new building construction and different arrangement form. Also, the service processing unit 150 may generate the second source code for generating the city planning analysis report that includes the type of building construction required in the next few years based on the type of the newly constructed building.

Referring to FIGS. 3 to 6, the service processing unit 150 may display, on the display, a first satellite image and a second satellite image captured in different years with respect to the selected administrative district. The service processing unit 150 may distinguishably display a building (an area including the building) B corresponding to the selected building type using a first color in the first satellite image and the second satellite image. Also, the service processing unit 150 may display an area C in which a number of buildings corresponding to the selected building type is greater than or equal to a threshold using a second color in the first satellite image and the second satellite image. In this manner, the first satellite image and the second satellite image may be comparatively displayed.

The education service providing apparatus using the satellite imagery according to an aspect is described above. Hereinafter, an education service providing method using satellite imagery according to another aspect is described.

The aforementioned technical features, operations, and configurations may also apply to the following education service providing method using the satellite imagery.

Figure 7:
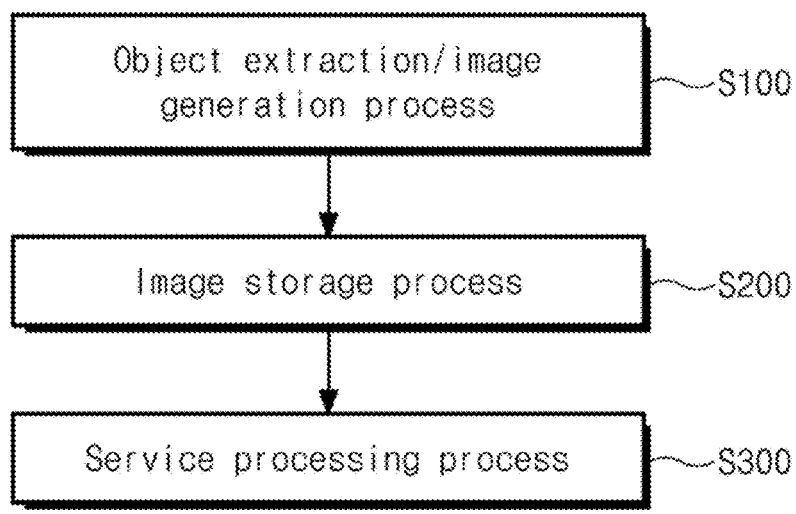
FIGS. 7 and 8 are flowcharts illustrating examples of a service providing method using satellite imagery according to an example embodiment.
Figure 8:
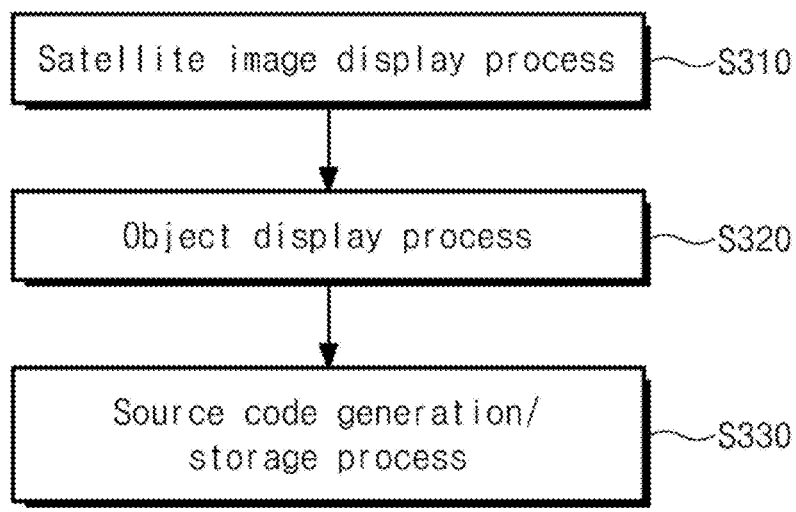

FIGS. 7 and 8 are flowcharts illustrating an education service providing method using satellite imagery according to an example embodiment. Referring to FIGS. 3 to 7, the service providing method using the satellite imagery may include an object extraction/image generation process S100, an image storage process S200, and a service processing process S300.

In the object extraction/image generation process S100, an acquired satellite image may be analyzed to extract an object from the satellite image and generate an object image corresponding to the object. In the image storage process S200, the satellite image and the object image may be stored. In the service processing process S300, an object extraction-based service and coding data associated with the object extraction-based service may be provided based on at least one of the satellite image and the object image.

Referring to FIGS. 1 to 8, the service processing process S300 may include a satellite image display process S310, an object display process S320, and a source code generation/storage process S330. The processes of FIGS. 7 and 8 are not limited to the illustrated order and may be variously modified depending on example embodiments.

In the satellite image display process S310, an interface for selecting an administrative district may be provided to a display, and the display may be controlled to display the satellite image based on the selected administrative district. In the object display process S320, an interface for selecting a type of a building to be detected may be provided to the display, and the display may be controlled to extract an object corresponding to the selected building type from the satellite image and to display the extracted object on the satellite image. In the source code generation/storage process S330, a source code for extracting an object corresponding to the selected building type from the satellite image may be generated in a block code form and the generated source code may be stored in a storage.

In the source code generation/storage process S330, a first source code for AI-based object extraction may be generated to extract an object corresponding to the selected building type from the satellite image. Also, in the source code generation/storage process S330, a second source code capable of generating AI-based different object analysis statistical data may be generated based on object extraction by year and by building type.

According to another example embodiment, in the source code generation/storage process S330, a first source code for determining locations of different buildings selected by the user from a group of buildings that belongs to the selected building type may be generated. Also, in the source code generation/storage process S330, a second source code for providing a plurality of travel route services according to the locations of different buildings and surrounding topography from the satellite image may be generated without receiving information from a satellite to calculate the locations of buildings and a current location of the user. Also, in the source code generation/storage process S330, the first source code and the second source code may be combined into a single block code executable with a one-time user input to store the same in the storage.

A service providing apparatus and method using satellite imagery according to an example embodiment is described above. The aforementioned service providing apparatus and method using the satellite imagery may achieve the following technical effect.

The service providing method and apparatus using the satellite imagery may effectively identify and classify various types of objects and buildings present on the ground surface. The service providing method and apparatus using the satellite imagery may provide an object extraction-based service and coding data associated with the object extraction-based service based on at least one of a satellite image and an object image.

The service providing method and apparatus using the satellite imagery may generate AI-based different object analysis statistical data based on object extraction by year and by type.

The service providing method and apparatus using the satellite imagery may provide a plurality of travel route services according to locations of different buildings and surrounding topography from a satellite image without receiving information from a satellite to calculate the locations of buildings and a current location of a user.

The service providing method using the satellite imagery according to the example embodiments may be implemented in a form of a program executable by a computer apparatus. For example, the program may include, alone or in combination with program instructions, data files, data structures, and the like. The program may be designed and manufactured using a machine code or a higher level code. The program may be specially designed to implement the service providing method using the satellite imagery and may be implemented using various functions or definitions well-known and available to those having skill in the computer software arts. Also, a computer apparatus in which the program is executable may include a processor, a memory, and the like to implement functions of the program and, if necessary, may further include a communication apparatus.

The program for implementing the service providing method using the satellite imagery may be recorded in non-transitory computer-readable media. Examples of the non-transitory computer-readable media may include magnetic media such as hard discs and floppy discs; optical media such as CD-ROM discs and DVDs; magneto-optical media such as floptical discs; and hardware apparatus that are specially configured to store and perform a specific program executed in response to call of a computer, such as ROM, RAM, flash memory.

A number of example embodiments regarding the service providing method and apparatus using the satellite imagery have been described above. Nonetheless, it should be understood that various modifications may be made to these example embodiments. For example, various apparatuses or methods achieved by one of ordinary skill in the art through alterations and modifications thereto may be an example embodiment of the service providing method and apparatus using the satellite imagery. For example, suitable results may be achieved if the described techniques are performed in a different order and/or if components in a described system, architecture, apparatus, or circuit are combined in a different manner and/or replaced or supplemented by other components or their equivalents. Accordingly, other implementations are still within the scope of the following claims.

What is claimed is:

1. A service providing apparatus using satellite imagery, the service providing apparatus comprising:
a processor configured to:
acquire satellite images;
analyze the satellite images;
extract objects from the satellite images;
generate object images corresponding to the objects;

store the satellite images and the object images in a storage; and provide an object extraction-based service and coding data associated with the object extraction-based service, based on the satellite images and the object images, wherein the processor is further configured to display:
a first satellite image and a second satellite image, which are captured in different years with respect to an administrative district selected by a user;
first building objects, which correspond to a building type selected by the user, with a first color;
second building objects, which do not correspond to the building type selected by the user, with a second color; and
one or more areas, in which a number of buildings corresponding to the building type is greater than or equal to a threshold, with a third color, and
wherein the first satellite image, the second satellite image, the first building objects, the second building objects, and the one or more areas are configured to be simultaneously displayed on a display.

2. The service providing apparatus of claim 1, wherein the processor is further configured to:
provide a first interface for selecting the administrative district;
provide a second interface for selecting the building type; and
extract the first building objects from the satellite images.

3. The service providing apparatus of claim 2, wherein the processor is further configured to
determine locations of different buildings selected by the user from a group of the first building objects, and
provide a plurality of travel routes according to the locations of different buildings and surrounding topography, which are acquired from the satellite images without receiving information from a satellite to calculate the locations of buildings and a current location of the user.

4. The service providing apparatus of claim 1, wherein the processor is further configured to generate, in a block code form, a source code for extracting the first building objects from the satellite images and store the generated source code in the storage.

5. The service providing apparatus of claim 4, wherein the processor is further configured to
extract data from the satellite images,
and generate object statistical analysis data by classifying years and types of buildings included in the satellite images.

6. The service providing apparatus of claim 1, wherein the processor is further configured to
generate a first source code for artificial intelligence (AI)-based object extraction to extract the first building objects from the satellite images, and
generate a second source code capable of generating AI-based different object analysis statistical data based on object extraction by year and by the building type.

7. The service providing apparatus of claim 2, wherein the processor is further configured to
generate a first source code for determining locations of different buildings selected by the user from a group of the first building objects,
generate a second source code for providing a plurality of travel routes according to the locations of different buildings and surrounding topography, which are acquired from the satellite image, without receiving information from a satellite to calculate the locations of buildings and a current location of the user, and
combine the first source code and the second source code into a single block code executable with a one-time user input and store the same in the storage.

8. A service providing method using satellite imagery, wherein the service providing method is performed by a ground station or a service providing apparatus using satellite imagery configured to communicably connect to the ground station, and comprises:
analyzing acquired satellite images;
extracting objects from the satellite images;
generating object images corresponding to the objects;
storing the satellite images and the object images in a storage;
providing an object extraction-based service and coding data associated with the object extraction-based service, based on the satellite images and the object images; and
displaying:
a first satellite image and a second satellite image, which are captured in different years with respect to an administrative district selected by a user;
first building objects, which correspond to a building type selected by the user, with a first color;
second building objects, which do not correspond to the building type selected by the user, with a second color; and
one or more areas, in which a number of buildings corresponding to the building type is greater than or equal to a threshold, with a third color, and
wherein the first satellite image, the second satellite image, the first building objects, the second building objects, and the one or more areas are simultaneously displayed on a display.

9. The service providing method of claim 8, wherein the displaying comprises:
providing a first interface for selecting the administrative district;
providing a second interface for selecting the building type;
extracting the first building objects from the satellite images;
generating, in a block code form, a source code for extracting the first building objects from the satellite images; and
storing the generated source code in the storage.

10. The service providing method of claim 9, wherein the generating the source code comprises:
generating a first source code for artificial intelligence (AI)-based object extraction to extract the first building objects from the satellite images; and
generating a second source code capable of generating AI-based different object analysis statistical data based on object extraction by year and by the building type.

11. The service providing method of claim 9, wherein the generating the source code comprises:
generating a first source code for determining locations of different buildings selected by the user from a group of the first building objects;
generating a second source code for providing a plurality of travel routes according to the locations of different buildings and surrounding topography, which are acquired from the satellite image without receiving information from a satellite to calculate the locations of buildings and a current location of the user; and combining the first source code and the second source code into a single block code executable with a one-time user input and store the same in the storage.

\* \* \* \* \*